May 22, 1951 — G. STEVENS — 2,554,389
CRANK CASE CLEANER
Filed Oct. 30, 1945

George Stevens
INVENTOR.

BY W. B. Harpman
ATTORNEY.

Patented May 22, 1951

2,554,389

UNITED STATES PATENT OFFICE 2,554,389

CRANKCASE CLEANER

George Stevens, Campbell, Ohio, assignor to Pete Parthemos, Youngstown, Ohio

Application October 30, 1945, Serial No. 625,514

1 Claim. (Cl. 134—167)

This invention relates to a crank case cleaner.

The principal object of the invention is the provision of a mechanism for use in forcefully directing fluid cleaning agent into a crank case of an automotive vehicle.

A further object of the invention is the provision of a mechanism for simultaneously directing a fluid cleaning agent into the crank case of a motor vehicle and collecting the cleaning agent and foreign material removed from the crank case thereby.

A still further object of the invention is the provision of a crank case cleaner incorporating means for handling a fluid cleaning agent employed in a crank case cleaning operation.

A still further object of the invention is the provision of a crank case cleaner incorporating means for filtering a fluid cleaning agent for reuse by the mechanism.

The crank case cleaner shown and described herein comprises an improvement over that shown in my co-pending patent application Serial No. 575,146, filed January 29, 1945. It has for its primary object the provision of a crank case cleaning mechanism. The crank case cleaner shown and described herein has been devised to form a simple and relatively inexpensive fluid cleaning agent handling mechanism which may be actuated by a compressed air source such as is commonly found in a service station. The device enables the crank case of an automotive vehicle to be effectively cleaned of various gum, sludge and foreign materials commonly found in crank cases of automotive vehicles.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing wherein.

Figure 1:
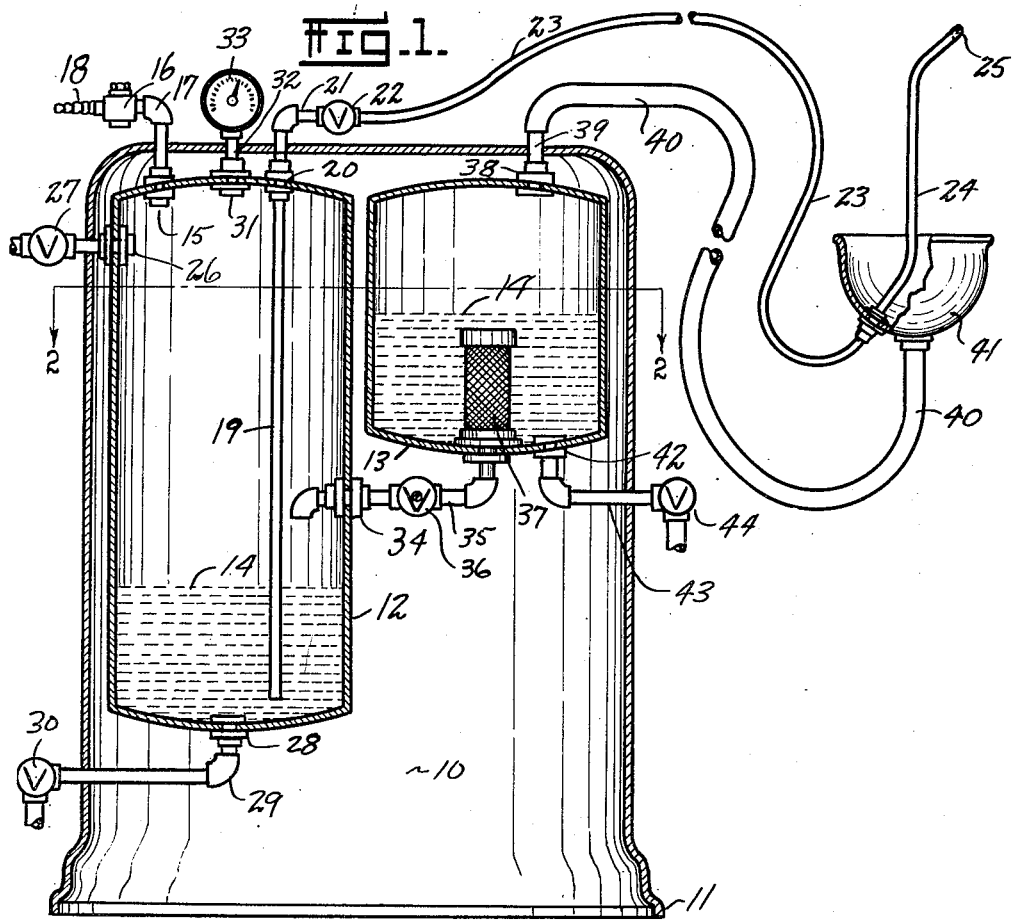
Figure 1 is a cross sectional side elevation with parts broken away illustrating the crank case cleaner.
Figure 2:
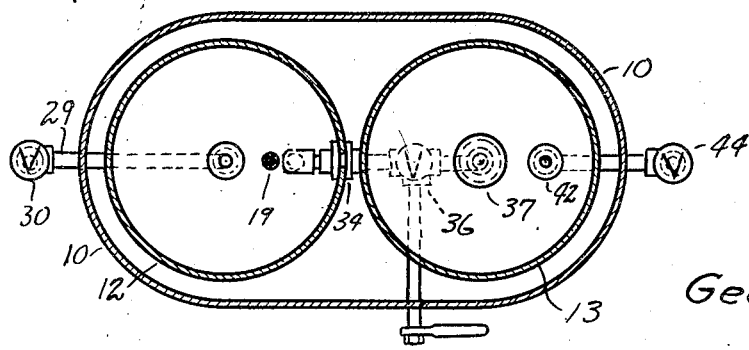
Figure 2 is a cross sectional horizontal elevation taken on line 2—2 of Figure 1 of the crank case cleaner.

By referring to the drawings and Figure 1 in particular, it will be observed that a crank case cleaner has been disclosed which consists of a body member 10 provided with an enlarged base area 11 and effectively supporting a pair of tanks 12 and 13 respectively. The tank 12 is of relatively larger size than the tank 13, for example, approximately twice as large, and comprises the primary cleaning fluid receptable, the cleaning fluid being indicated therein by the numeral 14. The cleaning fluid is preferably a non-aqueous solution such as carbon tetrachloride. A plurality of fittings establish communication with the tank 12 and include a fitting 15 which is connected exteriorly to a check valve 16 by means of tubing 17, and which check valve 16 is provided with a slip-on connection 18 for the reception of a section of compressed air hose through which compressed air may be introduced into the tank 12. It will be observed in this connection that the area of the tank 12 with respect to the quantity of cleaning fluid 14 therein is such as to permit the building up therein of a sufficient head of compressed air to satisfactorily expel the cleaning fluid 14 from the tank 12 as by way of an expelling tube 19. This tube 19, the lower end of which terminates near the bottom of the tank 12, emerges through the uppermost section of the tank 12 by way of a fitting 20 and communicates by means of tubing 21 and a valve 22 and a flexible hose 23 with an injection tube 24, the tip end of which is provided with a plurality of orifices 25 through which the cleaning agent is expelled with high velocity into the interior of a crank case to be cleaned. A fitting 26 on the tank 12 communicates with an externally located valve and vent 27 through which compressed air in the tank 12 may be released after a cleaning operation to permit the tank 12 to be recharged with cleaning fluid. A fitting 28 in the lowermost portion of the tank 12 is connected by means of tubing 29 with a valve 30 on the exterior of the body 10 and forms a sludge draining means. A fitting 31 on the top of the tank 12 communicates by means of tubing 32 with an air presssure gauge 33 which preferably records the pressure of compressed air within the tank 12 to indicate to the user the expelling force available.

The tank 13 which is also located within the body member 10 is connected with the tank 12 by way of a fitting 34, tubular connection 35 with a valve 36 and a filter 37 located within the exterior of the tank 13. A fitting 38 located in the top of the tank 13 establishes communication between a tube 39 and a flexible tubing 40 which in turn is connected with a liquid receiver 41 through which the injection tube 24 is positioned. Thus cleaning fluid received by the liquid receiver 41 at such time as it flows from a crank case of an automotive vehicle cleaned by the device is conveyed by the flexible tube 40 through the fitting 38 into the interior of the tank 13. A fitting 42 in the lowermost portion of the tank 13 establishes communication with the interior of the body member 10 by means of a tube 43 and a valve 44 thereon may be opened as in draining sludge from the tank 13.

It will thus be seen that at such time as the mechanism disclosed is to be used in cleaning an automotive vehicle crank case, a suitable quantity of cleaning fluid such as carbon tetrachloride and in the amount of ten gallons for example, is placed within the tank 12, the valves 27, 30 and 36 closed, and a connection with an air compressor established by way of the slip-on fitting 18, the check valve 16 and the fitting 15 with the tank 12. When a satisfactory head of compressed air has been introduced into the tank 12, the valve 22 is opened which permits the head of compressed air in the tank 12 to expel the cleaning fluid out of the tank 14 by way of the expelling tube 19, the flexible tube 23 and the injection tube 24 and hence into the interior of the crank case. As the cleaning fluid is very forcefully ejected from the orifices 25, the net result is a complete and thorough cleaning of the interior of the crank case as the cleaning agent employed, such as carbon tetrachloride, satisfactorily dissolves the gum, loosens the foreign deposits adhering to the interior of the crank case and washes out the residue. A liquid receiver 41 collects the fluid as it emerges from the crank case and the tube 40 guides it back to the tank 13 wherein it is deposited. When the cleaning operation is completed and the fluid 14 transferred from the tank 12 to the tank 13, the air supply source is disconnected. The valve 27 is opened to vent the tank 12, the valve 22 closed and the valve 36 opened to permit the fluid 14 in the tank 13 to drain by gravity through the filter 37 into the interior of the tank 12 by way of the fitting 34. The cleaning fluid filtered of the foreign material is thereby replaced in the tank 12 for subsequent operations and the valves 36 and 27 closed and the air pressure again re-established in the tank 12. It will also be seen that at such time as there is an accumulation of foreign material in the bottom of the tank 13 the valve 44 may be opened to drain the sediment therefrom.

It will be obvious to those skilled in the art that means for applying fluid pressure to the contents of the tank 12 may include other than an air compressor. For example, a cylinder of carbon dioxide may be advantageously employed or any other compressed gases known in the art.

It will thus be seen that a simple crank case cleaning mechanism has been disclosed which may be used to advantage in thoroughly cleaning the crank case of an automotive vehicle.

Having thus described my invention, what I claim is:

A crank case cleaning mechanism comprising an outer casing, a combined cleaning fluid and air container positioned in the casing, a contaminated cleaning fluid container also within the casing and in close relationship with the first mentioned container, the contaminated cleaning fluid container having a valved outlet pipe connection at its bottom with the interior of the combined air and cleaning fluid container, a filtering means within the contaminated fluid container at the outlet connection of the same with the air and cleaning fluid container, the air and cleaning fluid container having a tube extending from the exterior thereof interiorly of the same to adjacent the bottom thereof, the contaminated cleaning fluid container having an inlet pipe connection at the upper part thereof, the air and cleaning fluid container having a connection for a source of air exteriorly of the casing, the exterior projecting portion of the tube in the air and cleaning fluid container having attached thereto a flexible hose, the inlet pipe connection of the contaminated cleaning fluid and filtering container also having a flexible hose attached thereto, a contaminated cleaning fluid collector cup secured to the free end of the flexible hose connected to the inlet pipe of the contaminated fluid container, the free end of said hose opening into the cup, an elongated hollow nozzle secured to and forming a continuation of the flexible hose leading from the exterior portion of the tube extending into the cleaning fluid and air container, the nozzle being secured to and extending into the cup at a point adjacent the connection of the return hose for the contaminated fluid and extending considerably beyond the open end of the cup, the cup and nozzle being free and adapted to be manually held and manipulated so that when the air pressure is exerted on the cleaning fluid in the first mentioned container, the same will be forced through the tube that extends therein and outwardly thereof through the flexible hose that is attached thereto and the nozzle to the interior of a crank case to thoroughly flush and clean the same, and the contaminated cleaning fluid will be caught in the cup and drained back through the flexible hollow hose that is attached to the contaminated cleaning fluid container, and this fluid will be filtered and passed back through the conduit into the first mentioned container and continuously recirculated all while the cup and nozzle are manually held and manipulated by the operator.

GEORGE STEVENS.

REFERENCES CITED

The following references are of record in the file of this patent:

UNITED STATES PATENTS

| Number | Name | Date |
|---|---|---|
| 872,494 | Blackburn | Dec. 3, 1907 |
| 1,305,735 | Morris | June 3, 1919 |
| 1,552,998 | Menge | Sept. 8, 1925 |
| 1,684,047 | Stoven | Sept. 11, 1928 |
| 1,702,703 | Osborne | Feb. 19, 1929 |
| 1,820,552 | Wooley | Aug. 25, 1931 |
| 1,951,649 | Delano | Mar. 20, 1934 |
| 2,240,227 | Saussure | Apr. 29, 1941 |
| 2,322,729 | Holman | June 22, 1943 |
| 2,385,393 | Wilson | Sept. 25, 1945 |